United States Patent

Ishijima et al.

[11] Patent Number: 4,628,963
[45] Date of Patent: Dec. 16, 1986

[54] REFRIGERANT COMPRESSOR DISCHARGE VALVE

[75] Inventors: Koji Ishijima; Fumiaki Sano; Fumio Wada; Kazutomo Asami, all of Shizuoka, Japan

[73] Assignee: Mitsubishi Denki Kabushiki Kaisha, Tokyo, Japan

[21] Appl. No.: 757,418

[22] Filed: Jul. 22, 1985

[30] Foreign Application Priority Data

Sep. 6, 1984 [JP] Japan ................. 59-186901

[51] Int. Cl.[4] .............................. F16K 15/16
[52] U.S. Cl. ..................... 137/857; 188/282
[58] Field of Search ............. 137/843, 852, 854, 855, 137/856, 857, 858; 267/158; 188/282, 317, 322.13, 322.14, 322.15

[56] References Cited

U.S. PATENT DOCUMENTS

| 2,000,883 | 5/1935 | Cullen et al. | 137/857 |
| 2,118,356 | 5/1938 | Money | 137/856 |
| 2,161,769 | 6/1939 | Trask | 137/857 |
| 2,996,155 | 8/1961 | Priesemuth | 137/857 |
| 4,460,074 | 7/1984 | Müller et al. | 188/322.15 |

Primary Examiner—Martin P. Schwadron
Assistant Examiner—Sheri M. Novack
Attorney, Agent, or Firm—Sughrue, Mion, Zinn, Macpeak and Seas

[57] ABSTRACT

A discharge valve for a refrigerant compressor includes a leaf spring 10 for biasing a flexible valve plate 9 which opens and closes a refrigerant discharge port 8. The leaf spring has a centrally deformed portion which engages an intermediate portion of the valve plate. During the initial opening of the discharge port, no spring force is applied to the free end 9a of the valve plate to thereby reduce any opening delay and increase the efficiency of the compressor.

6 Claims, 11 Drawing Figures

REFRIGERANT COMPRESSOR DISCHARGE VALVE

BACKGROUND OF THE INVENTION

1. Field of the Invention

This invention relates to a discharge valve for a rotary refrigerant compressor.

2. Description of the Prior Art

FIGS. 1 through 4 illustrate a rotary compressor for a refrigerator as disclosed in Japanese Laid-Open Utility Model Publication No. 57174773, wherein a closed housing 1 contains a motor 2 and a compressor unit 3 comprising a cylinder 4, a crankshaft 5, a rolling piston 6, a radially slidable vane (not shown), and bearing end plates 7a, 7b closing the opposite ends of the cylinder to define a compression chamber A and support the crankshaft. The end plate 7a has a port 8 defined therein for discharging the refrigerant from the compression chamber A into the space within the housing. A valve plate 9 mounted on the end plate 7a has a free end 9a for opening and closing the discharge port 8. A leaf spring 10 is superposed on and fixed to the valve plate, and has a free end 10a for biasing the free end 9a of the valve plate into a closed position. A valve holder 11 is fastened by a bolt 12 to fix the opposite ends of the valve plate 9 and the leaf spring 10 to the bearing end plate 7a as shown in FIG. 3. The leaf spring has an intermediate bend at 10b for establishing its biasing force.

In operation, when the motor 2 is energized the crankshaft 5 is driven thereby to rotate the eccentrically mounted piston 6 and compress the refrigerant gas in the cylinder 4 as the volume of the chamber A varies. When the internal pressure in the compression chamber exceeds the sum of the pressure in the closed housing 1 and the biasing force of the leaf spring 10, the free ends of the valve plate 9 and the leaf spring flex upwardly to open the discharge port 8 and allow the compressed refrigerant gas to discharge into the housing.

By varying the thickness and/or shape of the leaf spring 10 with respect to the valve plate 9, the natural frequencies of the leaf spring and the valve plate are varied to reduce noises due to frictional damping forces generated between their contacting surfaces.

With the aforesaid construction of the conventional refrigerant discharge valve, the timing of the opening of the refrigerant discharge port is delayed by an interval corresponding to the resistance imposed by the leaf spring. The pressure in the cylinder 4 is thus built up to a higher level than the internal pressure in the housing, resulting in a so-called "overshoot" which requires an extra amount of drive power and lowers the efficiency of the compressor.

SUMMARY OF THE INVENTION

In view of the above drawbacks of the prior art discharge valve, it is an object of this invention to provide a refrigerant discharge valve which increases the efficiency of the compressor, reduces operation noise, requires no extra drive power, and produces no overshoot.

According to the invention these objects are achieved by a refrigerant discharge valve including a leaf spring for biasing a valve plate, the leaf spring having a deformed portion for establishing a biasing force, but wherein the spring engages the valve plate at an intermediate zone thereof, and the free end of the valve plate is not subjected to any spring pressure during the initial opening of the refrigerant discharge port. This arrangement reduces any delay in the timing of the opening of the discharge port by the free end of the valve plate.

DETAILED DESCRIPTION OF THE PREFERRED EMBODIMENTS

Figure 1:
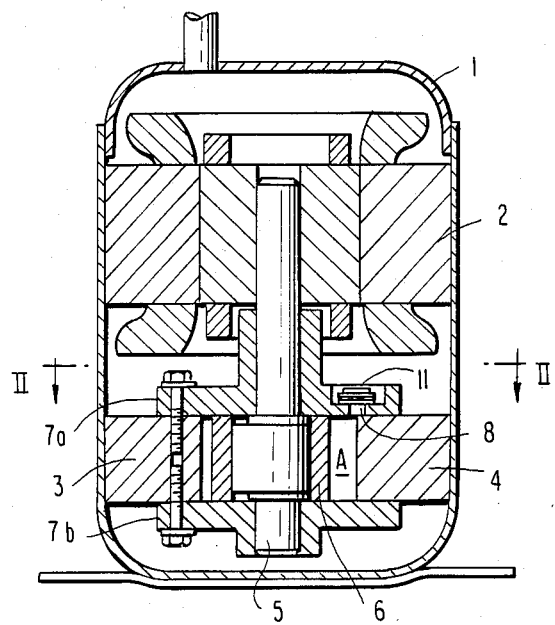
FIG. 1 is an axial cross-sectional view of a conventional refrigerant compressor incorporating a discharge valve.
Figure 2:
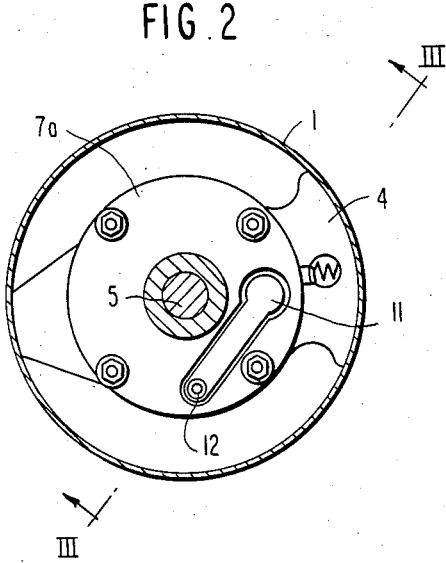
FIG. 2 is a cross-sectional view taken along line II—II of FIG. 1.
Figure 3:
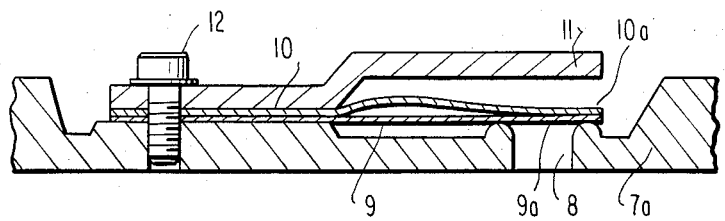
FIG. 3 is an enlarged cross-sectional view taken along line III—III of 2.
Figure 4:
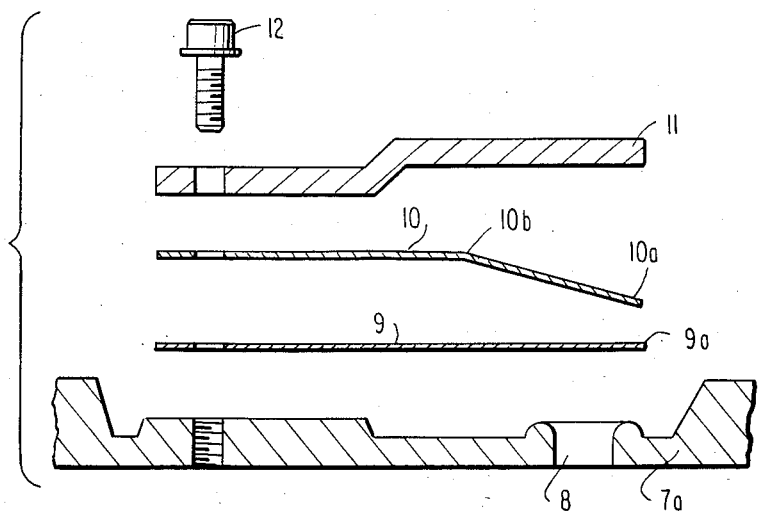
FIG. 4 is an exploded cross-sectional view of the refrigerant discharge valve of FIG. 3.
Figure 5:
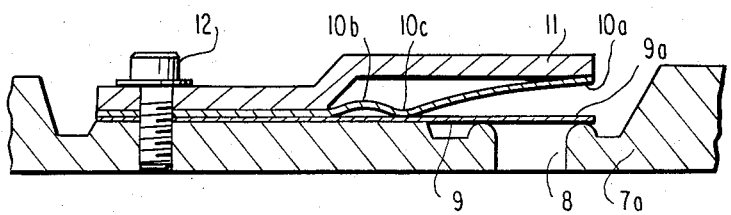
FIG. 5 is an enlarged cross-sectional view of a refrigerant compressor discharge valve according to the present invention.
Figure 6:
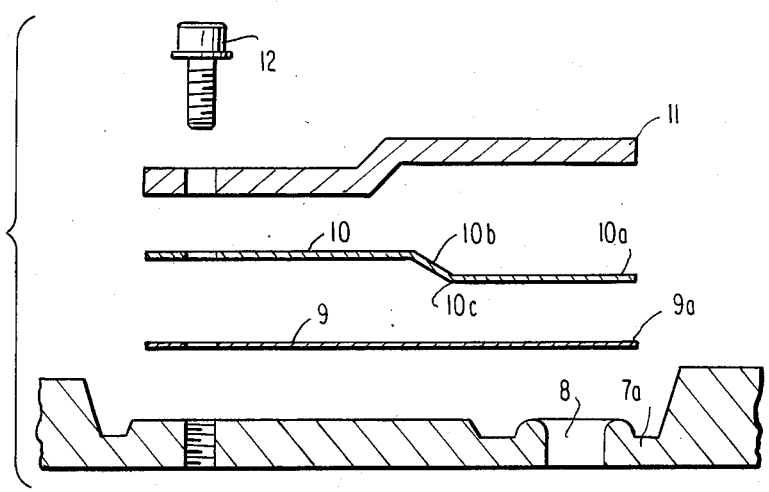
FIG. 6 is an exploded cross-sectional view of the discharge valve illustrated in FIG. 5.

FIGS. 5 through 7 illustrate a refrigerant discharge valve according to a first embodiment of the invention, wherein bearing end plate 7a has a refrigerant discharge port 8 as is conventional. A valve plate 9 mounted on the end plate 7a has a free end 9a for opening and closing the discharge port. A leaf spring 10 is superposed on the valve plate 9. A valve holder 11 is fastened by a bolt 12 to fix the opposite ends of the valve plate and the leaf spring to the end plate 7a as shown in FIG. 5. The leaf spring has a free end 10a, and a downwardly bent portion at an intermediate position 10b between the fixed and free ends thereof. The bent portion has a press point 10c which bears on an intermediate zone of the valve plate 9 to bias it downwardly against the end plate 7a. When assembled as shown in FIG. 5, the free end 10a of the leaf spring is held against the lower surface of the valve holder 11. Thus, no spring force is applied to the free end 9a of the valve plate, at least during the initial opening of the refrigerant discharge port 8.

Figure 7A:
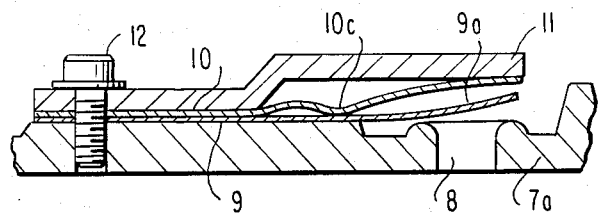
FIGS. 7(A), 7(B) and 7(C) are diagrams showing the comparative degrees of flexing of discharge valve plates of the invention and of the prior art.
Figure 7B:
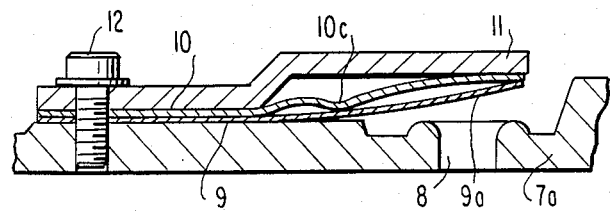
Figure 7C:
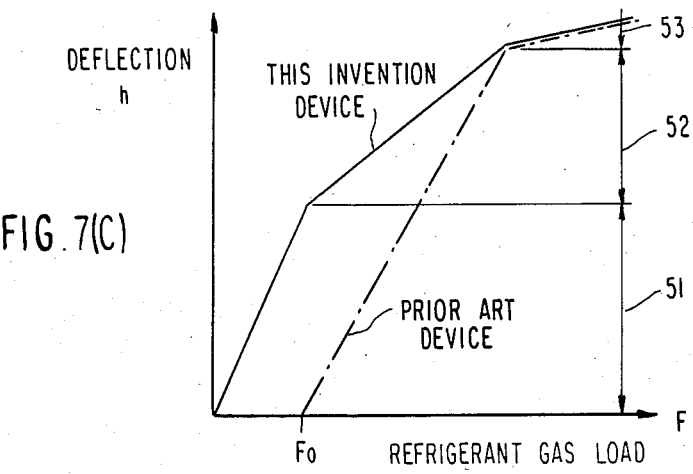

With this arrangement the flexing of the valve plate 9 at the time of discharging the compressed refrigerant varies through three regions 51 through 53 as indicated by the solid line in FIG. 7(C), dependent on the load from the compressed refrigerant gas.

When the pressure in the compression chamber A is equal to the internal pressure in the housing 1, that is, when the compressed refrigerant gas load F=0, the valve plate 9 starts to flex. In the region 51 the valve plate flexes without any biasing force from the leaf spring 10, as shown in FIG. 7(A). Thereafter, in the region 52 (with the parts in the condition as shown in FIG. 7(B), the biasing force from the spring acts on the valve plate, which then flexes at a reduced rate as the refrigerant gas load increases. More specifically, the force from the leaf spring 10 acts on the valve plate 9 through the bent portion of the spring. During the initial flexing of the valve plate no spring force is applied to its free end 9a.

With a conventional discharge valve, the valve plate is always biased by the leaf spring and does not begin to flex until the compressed refrigerant gas load F=Fo, as indicated by the chain line in FIG. 7(C). The discharge valve of the invention is not so constantly biased and thus opens at an earlier time, thereby reducing or substantially eliminating the opening pressure overshoot and attendantly reducing the compressor drive power. Since no leaf spring force acts on the free end of the valve plate during its initial flexing, the flow speed of the refrigerant through the discharge port is lowered, and hence any noise resulting from the refrigerant flow through the port is also reduced.

Inasmuch as the leaf spring is held at its free end against the valve holder 11 and at its press point 10c against the valve plate, it reduces noise due to frictional damping forces generated at the contact points, as with the conventional arrangement.

Figure 8:
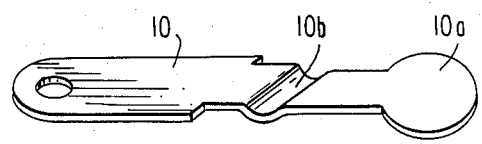
FIGS. 8 and 9 perspective views of leaf spring configurations according to other embodiments of the invention.
Figure 9:
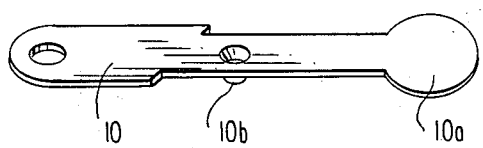

While in the foregoing embodiment the deformed portion of the spring comprises a vertically bent intermediate step, it may also comprise a U-shaped groove as shown in FIG. 8 or a circular projection as shown in FIG. 9. Moreover, the portion of the leaf spring extending from the press point 10c to the free end 10a may be simply omitted or eliminated, depending upon the flexural characteristics of the particular spring employed.

What is claimed is:

1. A discharge valve for a refrigerant compressor including a compression chamber (A) defined by an end plate (7a) having a refrigerant discharge port (8), said discharge valve comprising:
    (a) an elongate flexible valve plate (9) disposed on the end plate and having a freen end (9a) thereof disposed over the discharge port for opening and closing the port,
    (b) an elongate leaf spring (10) superposed over the valve plate,
    (c) an elongate holder member (11) superposed over the leaf spring,
    (d) means (12) clamping overlying ends of the holder member, the leaf spring and the valve plate remote from the port to the end plate, the holder member being configured to define a space above the port in which the valve plate may undergo flexural opening and closing movements, and
    (e) a linearity offsetting deformation defined in the leaf spring within said space and engaging the valve plate intermediate the clamped and free ends of the valve plate at a point spaced from the discharge port and lying between the discharge port and the clamped end of the valve plate to bias the valve plate towards the end plate and into a closed position while enabling unbiased flexing of said free end of the valve plate during initial opening of the port, there being no contact between the leaf spring and the valve plate proximate the free end of the valve plate and the discharge port, and the leaf spring being spaced from the valve plate intermediate the clamped end thereof and said point of engagement.

2. A discharge valve according to claim 1, wherein a free end of said leaf spring extending beyond said deformation and overlying said discharge port bears against a lower surface of said valve holder.

3. A discahrge valve according to claim 2, wherein the deformation comprises a downwardly bent stepped portion.

4. A discharge valve according to claim 2, wherein the deformation comprises a downwardly directed U-shaped groove.

5. A discharge valve according to claim 2, wherein the deformation comprises a downwardly directed circular projection.

6. A discharge valve according to claim 1, wherein a solid portion of the end plate underlies and supportively contacts the valve plate at said point of engagement.

* * * * *